United States Patent [19]
Villadsen

[11] 3,909,550
[45] Sept. 30, 1975

[54] KEY TELEPHONE SYSTEMS

[75] Inventor: Ove Villadsen, Wall, N.J.

[73] Assignee: International Components Corporation, Asbury Park, N.J.

[22] Filed: Mar. 28, 1974

[21] Appl. No.: 455,950

[52] U.S. Cl. .......................... 179/84 VF; 179/18 BF
[51] Int. Cl.[2] .......................................... H04M 1/26
[58] Field of Search .......... 179/84 VF, 84 SS, 84 R, 179/18 AD, 99, 18 BF, 37, 81 B

[56] References Cited

UNITED STATES PATENTS

| | | | |
|---|---|---|---|
| 3,562,434 | 2/1971 | Ohzeki | 179/16 |
| 3,582,562 | 6/1971 | Sellari | 179/18 AD |
| 3,622,710 | 11/1971 | Tothill | 179/84 VF |
| 3,626,106 | 12/1971 | Greening | 179/18 AD |

*Primary Examiner*—Kathleen H. Claffy
*Assistant Examiner*—Joseph Popek
*Attorney, Agent, or Firm*—Kenyon & Kenyon

[57] ABSTRACT

The instant invention concerns an improvement for Touch Tone telephone systems. It provides a means for preventing false digit dialing of an other than intended station in the intercom or external paging mode.

In Touch Tone systems, a receiver unit is employed which converts the frequencies representative of each digit dialed to a corresponding first logic output as well as a steering output each time a digit is dialed. The first logic output and the steering output are employed by the system to connect a calling station to a called station in the intercom Mode or to an external paging means, such as a loudspeaker, in the external paging mode.

Touch Tone systems, since they operate in response to particular frequencies corresponding to particular digits, are responsive to background noise in the vicinity of the calling station. This can result in false dialing of an other than intended station.

This invention provides relay means for interrupting the first logic output and steering output to preclude false dialing after a particular, intended station is called.

2 Claims, 2 Drawing Figures

KEY TELEPHONE SYSTEMS

BACKGROUND OF THE INVENTION

1. Field of the Invention

This invention relates generally to telephone intercom systems and more particularly to an intercom system suitable for use in TOUCH TONE receivers.

2. Description of the Problem

More complete communications systems of today provide for the originating, receiving, holding and transferring of calls to and from a common battery central office (CO) or private branch exchange (PBX). Further, these systems provide dial intercommunication (intercom) and external paging modes; the former between individual stations in the system or between an individual station and a group of stations and the latter between individual stations and external speakers strategically located throughout a facility.

While operating in these latter modes the so-called TOUCH-TONE (TT) receiver systems whose general operation is well known to those skilled in the art present certain peculiar problems which are the subject of the present invention. As is well known to those skilled in the telephone art, a typical TT receiver station receives and detects multifrequency tone signals representative of a particular digit dialed. The following table shows the standard, valid tone pair frequencies for a corresponding digit:

| Digit | Tone Pair (Hz) |
|---|---|
| 1 | 697 + 1209 |
| 2 | 697 + 1336 |
| 3 | 697 + 1477 |
| 4 | 770 + 1209 |
| 5 | 770 + 1336 |
| 6 | 770 +1477 |
| 7 | 852 + 1209 |
| 8 | 852 + 1336 |
| 9 | 852 + 1477 |
| 0 | 941 + 1336 |
| # | 941 + 1477 |
| * | 941 + 1209 |

Through selection of certain digits, alone or in combination, a calling station user can select another station on the intercom circuit, page all stations in a given group or connect the station to loudspeakers for external paging purposes.

It is apparent that the above frequency pairs fall within the audible frequency range. That is to say sounds which one would expect to be present in the vicinity of a calling station contain frequencies in the range of the above frequency pairs such that when such sounds are "picked-up" by the calling station, the system will respond as if a corresponding digit was dialed. The result is that the calling station is inadvertently connected to other than the intended station or external paging mode.

It is therefore an object of this invention to provide a means for minimizing the receptivity of touch-tone systems, operating in the paging mode, to extraneous sounds which otherwise would result in connection of the calling station to other than intended stations.

SUMMARY OF THE INVENTION

The receiver unit associated with TT systems converts the frequencies representative of each digit dialed to a corresponding first logic output as well as a steering output each time a digit is dialed. The system responds to the first logic output and steering output to connect the calling station to the selected called station or external paging means depending on the Mode selected.

The present invention through relay means interrupts the first logic output and the steering output after the prescribed number of digits to thereby preclude false dialing due to extraneous background noises.

BRIEF DESCRIPTION OF THE DRAWINGS

Reference is now made to the accompanying drawings for a better understanding of the nature and objects of the invention. The drawings illustrate the best mode presently contemplated for carrying out the objects of the invention and its principles, and are not to be construed as restrictions of limitations on its scope. In the drawings.

DESCRIPTION OF THE PREFERRED EMBODIMENTS

Figures 1, 2:
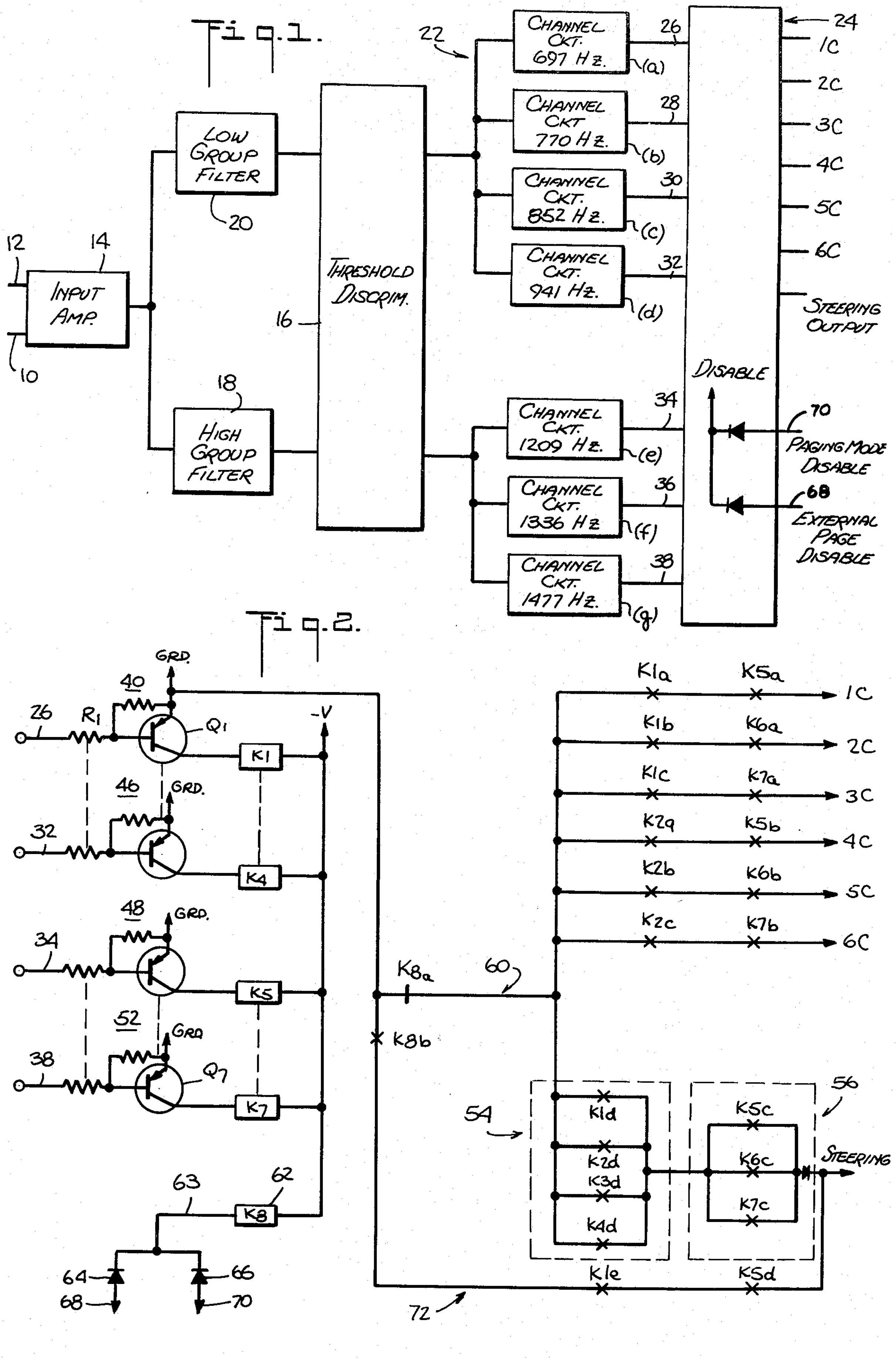
FIG. 1 is a functional diagram of a typical Touch Tone receiver unit.
FIG. 2 is a schematic of the circuitry inplementing the invention.

Before detailing the particulars of the present invention it would be beneficial to review generally the operation of a typical receiver unit used in a key system. The purpose of the receiver unit is to recognize valid multifrequency tones present for a specified minimum period of time generated by subscriber, subsets or other signaling sources and convert these tones to logic level output for use in placing calls to the central office, making intercom calls, external paging, etc.

FIG. 1 represents a block diagram of such a receiver unit for use with Touch Tone type systems. The receiver unit is connected across the Tip and Ring line of the system via lines 10 and 12.

The multifrequency tones generated for each digit dialed, see the table above, are converted and amplified in amplifier 14 to a level suitable for threshold detection in threshold discriminator 16. Prior to processing in the discriminator, the amplified multifrequency signal is separated into high and low frequency signal groups by suitable filter networks, 18 and 20, respectively. The high pass filter network would permit passage of frequencies of 1209, 1336 or 1477 HZ while the low pass filter network 20 would pass frequencies of 697, 770, 852 or 941 HZ. The threshold discriminator provides a certain protection against other than telephone system generated signals from activating the relays downstream. It does this by precluding low amplitude signals for each group, high and low, from passing through to the channel circuit group 22 which preferably consists of seven active band-pass filters, each followed by a level detector. The band-pass filters have center frequencies corresponding to the Touch-Tone transmission signals with a sufficiently narrow bandwidth to reject spurious signals. The level detectors convert the AC output signals of the band-pass filter into logic level outputs on lines 26,28,30,32,34,36 and 38, which are then processed in the translator, 24.

The levels appearing on two of the outputs 26 through 38, corresponding to the particular digit dialed, are responded to by relay circuitry in the translator, 24. The particulars of operation of the relevant portions of the translator 24 will now be discussed with reference to FIG. 2.

FIG. 2 shows in detail schematic form the translator portion of the receiver unit. Depending on the digit dialed logic levels appear on two of the inputs to corresponding relay drive circuits, 40, 42, 44, 46, 48, 50 and 52. Only two of the relay drive circuits each for the low frequency and high frequency grouping are shown but it is to be understood that there are two more for the low frequency group and one more for the high frequency group which are identical in configuration to those shown but which have been omitted for clarity reasons. The circuits omitted would drive the relay coils associated with K2, K3 and K6 relays, for which only the corresponding contacts are shown. Following standard terminology, when the relay contact is shown as an X, this means that the contact will be "made" or closed when the corresponding coil is energized. The + symbol indicates that the contact will open or "break" when the corresponding coil is energized.

The outputs 1C through 6C provide ground potential to follow-on relay coils, not shown. Particular ones of said latter coils are energized in response to the digits dialed and by their action connect the calling station to a called station or external speakers, completing the intercom or paging circuit.

Typically, the calling station operator would dial one or two digits and he would be connected to another or "called" station, all stations in a group or one of several external zone paging systems. The following table shows a typical digit - mode combination:

| | Digits Dialed | Mode |
|---|---|---|
| (a) | "2" plus "1" through "0"<br>"3" plus "1" through "0"<br>"4" plus "1" through "0" | Individual Station page |
| (b) | "5" | Page all stations |
| (c)) | "7", "8", "9", or "0" | External Zone Paging |

When each digit is dialed, logic levels appear at corresponding ones of each of the channel circuits 22 in accordance with the first listed table. E.g., when the digit 3 is dialed, represented by the tone pair (697 + 1477) HZ, logic levels appear at the output of channel circuits 22*a* and 22*g*, on leads 26 and 38 respectively.

These logic levels are supplied to the inputs of relay circuits 40 and 52 respectively and have a voltage level, sufficient to "turn-on" transistors Q1 and Q7. The "turned-on" transistors connect, respectively, K1 and K7 relay coils to ground potential. Since the other side of the coils is connected to −V volts, a voltage sufficient to energize the relay in accordance with its operating characteristics, the relay K1 and K7 are energized. With K1 and K7 relays energized, contacts K1*c* and K7*a* connecting output 3C to system ground through contact K8*a*, are closed.

The following table shows which of the 1C through 6C outputs are connected to system ground for each of the digits dialed. Note, additional relay contacts required to implement digits 7, 8, 9 and 0 are omitted from FIG. 2 for purposes of clarity since they are not essential to an understanding of the invention. The particular relays energized for each digit are also listed.

| DIGIT | RELAYS | 1C | 2C | 3C | 4C | 5C | 6C |
|---|---|---|---|---|---|---|---|
| 1 | K1+K5 | X | | | | | |

-Continued

| DIGIT | RELAYS | 1C | 2C | 3C | 4C | 5C | 6C |
|---|---|---|---|---|---|---|---|
| 2 | K1+K6 | | X | | | | |
| 3 | K1+K7 | | | X | | | |
| 4 | K2+K5 | | | | X | | |
| 5 | K2+K6 | | | | | X | |
| 6 | K2+K7 | | | | | | X |
| 7 | K3+K5 | X | | | | | X |
| 8 | K3+K6 | | X | | | | X |
| 9 | K3+K7 | | | X | | | X |
| 0 | K4+K6 | | | | X | | X |

In addition to the 1C through 6C outputs, a so called "steering output" is required simultaneously therewith. Its function, well known to those skilled in the art, is to identify for the balance of the system when a valid digit has been dialed and when the signal frequency representing that digit has been complete. For example, a control relay (not shown) would respond to the ground level appearing at the steering output and interact with a digit register. The latter would store the digit value of each of the digits dialed in the intercom mode and insure that the proper station was connected to the calling station.

The steering output is implemented by connecting system ground, through relay contact K8*a*, to the steering output lead via two groups of relay contacts. The first group 54 consisting of contacts associated with relays K1, K2, K3 and K4 and the second 56 comprising contacts associated with relays K5, K6 and K7. From the last table, it can be seen that each digit dialed activates one relay in each group. Thus the steering output will be connected to system ground through appropriate contacts in each group for any digit dialed thereby providing the necessary control signal for the balance of the system.

The explanation so far in describing how necessary logic levels at the 1C through 6C and steering outputs is generated is well known in the art. The problem overcome by the instant invention results from the fact that certain background noises sustained for a period of time will result in the Touch Tone receiver unit just described responding thereto as if a valid digit were dialed. Thus, for example, if one has dialed a particular station on the intercom and while waiting for the called party to answer, the calling handset is exposed to suitable background noise for the right period of time, a false digit can be detected by the receiver which might result in a different station being connected in circuit with the calling station. In order to overcome this problem, the invention contemplates interrupting the 1C through 6C and steering outputs after two digits are dialed in the intercom Mode or one digit in the external page mode. Since the balance of the intercom or external page system requires both the 1C through 6C outputs and steering output to occur simultaneously in order to identify a called station, by interrupting these outputs after one or two digits depending on the Mode, the prior art system is precluded from jumping stations. Rely K8 is inserted in the ground return path 60 for both the 1C through 6C outputs and steering output to implement the invention.

When relay K8 is energized, contact K8*a* is opened so that neither of the required outputs can find a path to ground. K8's Relay coil, 62, has one side returned to −V volts. The other side thereof, 63, is connected through diode 64 to a logic level (ground potential)

provided by circuitry not shown but familiar to those in the art, which appears on lead 68, after either one of the external page digits 7, 8, 9 or 0 is dialed. Side 63 is also connected to lead 70 through diode 66. Lead 70 is connected to circuitry, not shown which produces a logic level, ground potential, at this lead whenever the two digits representing the called station in the intercom Mode have been dialed. Thus, the energized relay K8 prohibits the steering and 1C through 6C outputs from being connected to system ground once the called station or external paging Mode has been selected.

In certain systems, once the called station has been dialed the caller is connected directly to a loudspeaker in the called station equipment. The calling party can thus begin to converse with the called party provided the latter is in close proximity to his phone. However, where the called party is not close to his phone a means for signalling him or all the phones in a group is required. This is provided in systems by the tone signalling mode. In effect, after a station or group of stations is selected, the calling party can signal the called station or stations by dialing the digit 1.

However, with the cutout relay K8 inserted in the system ground path as described above this tone signalling Mode would be precluded unless a separate path were provided. Thus a by-pass path, connecting steering output to system ground 72 is provided which enables the calling party to tone signal the called party. When the digit "1" is dialed, the steering output is connected to the ground through K5*d*, Kl*e* and K8*b*. Thus means are provided for substantially precluding the false switching of stations once a particular station or external paging Mode is selected. Because tone signalling is required in practical systems, the present invention provides a suitable means for eliminating the false digit switching problem in all cases but the digit 1 -a substantial reduction of the problem.

It is to be appreciated that changes in the above embodiments can be made without departing from the scope of the present invention. Other variations of the specific construction disclosed above can be made by those skilled in the art without departing from the invention as defined in the appended claims.

What is claimed is:

1. In a receiver unit for a key telephone system having an intercom and external paging mode said receiver unit including a translator circuit for converting frequencies representative of each digit dialed into a corresponding first logic output and which further provides a steering logic output for all digits dialed wherein said key telephone receiver is responsive to said first logic output and said steering logic output in combination such that said receiver connects a called station to a calling station when in said intercom mode after a predetermined number of digits are dialed or connects said calling station to external paging means after a predetermined digit or digits is dialed, each of said first logic outputs connected through corresponding switch contacts to a first common point when the corresponding digit is dialed, and said steering logic output connected to said first common point through corresponding switch contacts whenever any digit is dialed, the improvement which comprises:

a. a second common point having a voltage potential corresponding to a first logic level;
b. a first cutout switch contact connected in series between said first common point and said second common point; and
c. means responsive to the dialing of said predetermined number of digits or said predetermined digit, for operating said first cutout switch contact, such that said cutout switch contact is opened after said predetermined number of digits or said predetermined digit is dialed, whereby said first logic outputs and said steering logic output are disconnected from said second common point.

2. The improvement of claim 1 further comprising means for tone signalling the called stations including:

a. a first set of switch contacts connected to the steering logic output and set in the closed position when the tone signalling digit is dialed; and
b. a second cutout relay contact connected in series between said first set of switch contacts and said second common point, said second cutout relay contact set in the closed position when said first cutout relay contact is set in the opened position in the intercom or paging mode, whereby said steering logic output is connected to said first logic level when the tone signalling digit is dialed.

* * * * *